(12) United States Patent
Tambasco

(10) Patent No.: US 11,351,766 B2
(45) Date of Patent: Jun. 7, 2022

(54) PROCESS FOR APPLYING FILM BACKING TO SYNTHETIC TURF AND PRODUCT

(71) Applicant: Giuseppe V Tambasco, Marietta, GA (US)

(72) Inventor: Giuseppe V Tambasco, Marietta, GA (US)

(73) Assignee: Textile Rubber and Chemical Company, Inc., Dalton, GA (US)

( * ) Notice: Subject to any disclaimer, the term of this patent is extended or adjusted under 35 U.S.C. 154(b) by 303 days.

(21) Appl. No.: 16/679,653

(22) Filed: Nov. 11, 2019

(65) Prior Publication Data

US 2021/0138779 A1     May 13, 2021

(51) Int. Cl.
*A41G 1/00*         (2006.01)
*B32B 27/12*       (2006.01)
(Continued)

(52) U.S. Cl.
CPC .......... *B32B 37/1207* (2013.01); *A41G 1/009* (2013.01); *B32B 5/022* (2013.01);
(Continued)

(58) Field of Classification Search
CPC ........ A41G 1/009; B32B 5/022; B32B 5/024; B32B 5/028; B32B 5/06; B32B 5/08;
(Continued)

(56) References Cited

U.S. PATENT DOCUMENTS

| | | |
|---|---|---|
| 4,205,112 A | 5/1980 | Mervin |
| 4,437,918 A * | 3/1984 | Morohashi .......... B32B 38/1833 156/324 |

(Continued)

FOREIGN PATENT DOCUMENTS

| | | |
|---|---|---|
| EP | 1231247 A1 | 8/2002 |
| JP | 3322664 | 11/1994 |

(Continued)

OTHER PUBLICATIONS

European Search Report, Application No. 17189588.1 dated Nov. 17, 2017.

(Continued)

*Primary Examiner* — Michael A Tolin
(74) *Attorney, Agent, or Firm* — Robert E. Richards; Richards IP Law

(57) ABSTRACT

The invention comprises a method of making synthetic turf. The method comprises applying an ethylene-vinyl acetate copolymer adhesive to a first primary surface of a tufted primary backing to form a coating thereon and wherein the primary backing is tufted with a plurality of synthetic filaments to form a face pile extending outwardly from a second primary surface of the synthetic turf opposite the first primary surface and heating the ethylene-vinyl acetate copolymer adhesive to a temperature above its melting point so that the ethylene-vinyl acetate copolymer adhesive melts and at least partially flows into the primary backing. The method also comprises heating a linear low-density polyethylene film to a temperature below the softening point of the film and pressing the heated linear low-density polyethylene film into contact with the polymer coated first primary surface of the tufted primary backing. The method further comprises allowing the ethylene-vinyl acetate copolymer adhesive and the linear low-density polyethylene film to cool, whereby the linear low-density polyethylene film is adhered to the tufted primary backing.

22 Claims, 3 Drawing Sheets

(51) Int. Cl.
*B32B 27/32* (2006.01)
*B32B 37/12* (2006.01)
*B32B 5/26* (2006.01)
*B32B 7/12* (2006.01)
*D06N 7/00* (2006.01)
*B32B 37/06* (2006.01)
*B32B 5/02* (2006.01)
*B32B 38/00* (2006.01)

(52) U.S. Cl.
CPC .............. *B32B 5/024* (2013.01); *B32B 5/26* (2013.01); *B32B 7/12* (2013.01); *B32B 27/12* (2013.01); *B32B 27/32* (2013.01); *B32B 37/06* (2013.01); *B32B 38/00* (2013.01); *D06N 7/0068* (2013.01); *D06N 7/0076* (2013.01); B32B 2037/1215 (2013.01); B32B 2037/1238 (2013.01); B32B 2038/008 (2013.01); B32B 2262/0253 (2013.01); B32B 2262/0284 (2013.01); B32B 2307/72 (2013.01); B32B 2323/046 (2013.01); B32B 2323/10 (2013.01); B32B 2367/00 (2013.01); B32B 2471/02 (2013.01); D06N 2201/0254 (2013.01); D06N 2205/10 (2013.01)

(58) Field of Classification Search
CPC B32B 5/26; B32B 5/262; B32B 5/275; B32B 7/12; B32B 27/12; B32B 27/32; B32B 37/06; B32B 37/1207; B32B 37/1284; B32B 2037/1215; B32B 2037/1238; B32B 38/00; B32B 2038/008; B32B 2250/02; B32B 2250/03; B32B 2262/0253; B32B 2262/0284; B32B 2262/06; B32B 2307/72; B32B 2307/732; B32B 2310/0825; B32B 2323/046; B32B 2323/10; B32B 2367/00; B32B 2471/02; D05C 17/023; D06N 7/0005; D06N 7/0036; D06N 7/006; D06N 7/0063; D06N 7/0068; D06N 7/0071; D06N 7/0073; D06N 7/0076; D06N 7/0078; D06N 2201/02; D06N 2201/0254; D06N 2205/02; D06N 2205/023; D06N 2205/10; D06N 2207/123; D10B 2505/202; E01C 13/08
See application file for complete search history.

(56) References Cited

U.S. PATENT DOCUMENTS

| | | | |
|---|---|---|---|
| 4,808,459 | A | 2/1989 | Smith et al. |
| 4,836,871 | A | 6/1989 | Kato |
| 5,856,376 | A | 1/1999 | Wong |
| 5,902,663 | A | 5/1999 | Justesen et al. |
| 5,962,564 | A | 10/1999 | Braud et al. |
| 6,383,586 | B1 | 5/2002 | Langland |
| 6,475,592 | B1 * | 11/2002 | Irwin .................. D06N 7/0068 428/95 |
| 6,475,619 | B2 | 11/2002 | Goldberg |
| 6,521,696 | B2 | 2/2003 | Oates et al. |
| 6,673,432 | B2 | 1/2004 | Kiik et al. |
| 6,743,741 | B1 | 6/2004 | Araki et al. |
| 6,808,786 | B2 | 10/2004 | Theiss |
| 7,018,492 | B1 | 3/2006 | Mumm et al. |
| 7,081,498 | B2 | 8/2006 | Moeller et al. |
| 7,267,870 | B2 | 9/2007 | Matsumoto et al. |
| 7,335,423 | B2 | 2/2008 | Huber |
| 7,348,048 | B2 | 3/2008 | Rabasco et al. |
| 7,357,971 | B2 | 4/2008 | Bieser et al. |
| 7,645,829 | B2 | 1/2010 | Tse et al. |
| 7,816,003 | B1 | 10/2010 | Luchio |
| 7,910,194 | B2 | 3/2011 | Bieser et al. |
| 8,283,017 | B2 | 10/2012 | Bieser et al. |
| 8,496,769 | B2 | 7/2013 | Brumbelow et al. |
| 9,051,683 | B2 | 6/2015 | Brumbelow et al. |
| 9,376,769 | B2 | 6/2016 | Bieser et al. |
| 10,202,722 | B2 | 2/2019 | Mashburn et al. |
| 2001/0046581 | A1 | 11/2001 | Brumbelow et al. |
| 2002/0134486 | A1 | 9/2002 | Brumbelow et al. |
| 2002/0172795 | A1* | 11/2002 | Gardner .............. D06N 7/0068 428/95 |
| 2004/0043184 | A1 | 3/2004 | Kobayashi et al. |
| 2004/0258874 | A1 | 12/2004 | Desai |
| 2005/0281977 | A1 | 12/2005 | Mashburn |
| 2007/0071988 | A1 | 3/2007 | Botros |
| 2007/0082172 | A1 | 4/2007 | Derbyshire et al. |
| 2007/0254130 | A1 | 11/2007 | Cheek |
| 2007/0259163 | A1 | 11/2007 | Connolly et al. |
| 2007/0270064 | A1 | 11/2007 | Aseere |
| 2008/0274307 | A1 | 11/2008 | Chereau et al. |
| 2009/0022936 | A1 | 1/2009 | McGill |
| 2010/0137493 | A1 | 6/2010 | Tilton |
| 2010/0247814 | A1 | 9/2010 | Nisikawa et al. |
| 2010/0310813 | A1 | 12/2010 | McGill |
| 2013/0206630 | A1 | 8/2013 | Burmeister |
| 2013/0261238 | A1 | 10/2013 | Arango |
| 2013/0344281 | A1 | 12/2013 | Wright et al. |
| 2014/0349060 | A1 | 11/2014 | Mueller et al. |
| 2015/0086746 | A1 | 3/2015 | de Castro et al. |
| 2016/0201239 | A1 | 8/2016 | Baer et al. |
| 2016/0298003 | A1 | 10/2016 | Alsoryai |
| 2017/0166771 | A1 | 6/2017 | Hall, Jr. |

FOREIGN PATENT DOCUMENTS

| | | |
|---|---|---|
| JP | 2008099805 | 10/2006 |
| WO | 9506771 A1 | 3/1995 |
| WO | 9940250 A2 | 8/1999 |
| WO | 0132976 A1 | 5/2001 |
| WO | 0140561 A2 | 6/2001 |
| WO | 2004035910 A1 | 4/2004 |
| WO | 2006032433 A1 | 3/2006 |
| WO | 2008124449 A2 | 10/2008 |
| WO | 2013093547 A1 | 6/2013 |

OTHER PUBLICATIONS

European Search Report, Application No. 17189839.8 dated Mar. 7, 2018.
Machine translation of JP 5148751.
Machine translation of JP 6322664.
Machine translation of JP 6059176.
U.S. Appl. No. 15/469,637, filed Mar. 27, 2017.
U.S. Appl. No. 15/608,334, filed May 30, 2017.
English Abstract of JP 20899805.
U.S. Appl. No. 15/989,891, filed May 25, 2018.
U.S. Appl. No. 16/229,588, filed Dec. 21, 2018.

* cited by examiner

PROCESS FOR APPLYING FILM BACKING TO SYNTHETIC TURF AND PRODUCT

FIELD OF THE INVENTION

The present invention generally relates to synthetic turf. More particularly, the present invention relates to a method for applying a polymer film to a primary backing of synthetic turf. The present invention also relates to a novel synthetic turf and integral geomembrane that can be used to cap a land reclamation site.

BACKGROUND OF THE INVENTION

Synthetic turf is typically constructed from a primary backing material and a face pile formed on one side. Face pile can be formed in the primary backing by tufting a yarn or bundles of filaments in the primary backing. Currently, the majority of synthetic turf manufactured in the U.S. is made by a tufting process. The tufting process forms cut pile on one side of a primary backing and loop backs on the opposite side by a process well known in the art. The primary backing can be made from a woven or nonwoven fabric of synthetic materials. Typically, the primary backing of a synthetic turf is tufted with multiple strands that form a tufted fiber bundle.

After the primary backing is tufted, an adhesive precoat may be applied to lock or bind the tufts or tuft bundles in the primary backing. Typically, the adhesive precoat is a thermoset polyurethane polymer or an aqueous polymer dispersion, such as a styrene butadiene aqueous polymer dispersion. The thermoset polyurethane polymer or aqueous polymer dispersion-coated primary backing is then heated to initiate polyurethane polymerization or to remove the water from the aqueous polymer dispersion such that the polymer locks or binds the tuft loops in the primary backing. Then, a secondary backing may optionally be adhesively attached by applying a coating of adhesive on the side of the primary backing opposite the face pile. Such adhesive is typically a polyurethane, a latex or a hot melt adhesive. Then, the secondary backing is brought into intimate contact with the polymerizing polyurethane, uncured latex or the molten hot melt adhesive. The adhesive is then allowed to cool or cure, thereby adhesively attaching the secondary backing to the tufted primary backing. The secondary backing is typically a woven or nonwoven synthetic material, such as the same material from which the primary backing is made.

Recently, artificial turf is being used as a capping system for land reclamation. U.S. Pat. No. 10,189,061 (the disclosure of which is incorporated herein by reference) discloses such a capping system. The '016 patent discloses a synthetic turf that can be used in a soil reclamation capping system. The synthetic turf disclosed in the '016 patent comprises a primary backing made of woven polypropylene tufted with polyethylene monofilaments. A geomembrane, made from 45 mil thick ethylene propylene diene terpolymer, is attached to the tufted primary backing with a hot melt adhesive. The hot melt adhesive functions to both adhere the geomembrane to the tufted primary back, but to also provide tuft lock to the tufted polyethylene monofilaments. The composite synthetic turf can then be used to cap a land reclamation site, such as a landfill. It would be desirable to provide an improved synthetic turf that does not require the use of hot melt adhesives. It would also be desirable to provide a synthetic turf and integral geomembrane for capping land reclamation. It would also be desirable to provide a novel method of attaching a geomembrane to a synthetic turf.

SUMMARY OF THE INVENTION

The present invention satisfies the foregoing needs by providing an improved synthetic turf and an improved process for making synthetic turf for use in land reclamation.

In one disclosed embodiment, the present invention comprises a method of making synthetic turf. The method comprises applying an ethylene-vinyl acetate copolymer adhesive to a first primary surface of a tufted primary backing to form a coating thereon and wherein the primary backing is tufted with a plurality of synthetic filaments to form a face pile extending outwardly from a second primary surface of the synthetic turf opposite the first primary surface and heating the ethylene vinyl acetate copolymer adhesive to a temperature above its melting point so that the polyethylene copolymer adhesive melts and at least partially flows into the primary backing. The method also comprises heating a linear low-density polyethylene film to a temperature below the softening point of the film and pressing the heated linear low-density polyethylene film into contact with the polymer coated first primary surface of the tufted primary backing. The method further comprises allowing the ethylene vinyl acetate copolymer adhesive and the linear low-density polyethylene film to cool, whereby the linear low-density polyethylene film is adhered to the tufted primary backing.

In another disclosed embodiment, the present invention comprises a method of making synthetic turf. The method comprises applying an ethylene-vinyl acetate copolymer adhesive to a first primary surface of a tufted primary backing to form a coating thereon, wherein the primary backing is tufted with a plurality of synthetic filaments to form a face pile extending outwardly from a second primary surface of the synthetic turf opposite the first primary surface and wherein the primary backing comprises a woven polypropylene and heating the ethylene vinyl acetate copolymer adhesive to a temperature above its melting point so that the ethylene-vinyl acetate copolymer adhesive melts and at least partially flows into the primary backing. The method also comprises heating a linear low-density polyethylene film to a temperature below the softening point of the film and pressing the heated linear low-density polyethylene film into contact with the polymer coated first primary surface of the tufted primary backing. The method further comprises allowing the ethylene vinyl acetate copolymer adhesive and the linear low-density polyethylene film to cool, whereby the linear low-density polyethylene film is adhered to the tufted primary backing.

In another disclosed embodiment, the present invention comprises a synthetic turf made by the processes disclosed herein.

Accordingly, it is an object of the present invention to provide an improved synthetic turf.

Another object of the present invention is to provide an improved product for use in land reclamation.

A further object of the present invention is to provide a synthetic turf adhesive system that does not sacrifice desired physical properties of the finished product.

A further object of the present invention is to provide an improved adhesive system for providing bundle lock and filament bind of a tufted pile in primary backing of a tufted synthetic turf.

Yet another object of the present invention is to provide an improved adhesive system for attaching a geomembrane to a primary backing of a synthetic turf Another object of the present invention is to provide a synthetic turf product for use in a capping system for a land reclamation site that is easier to install.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
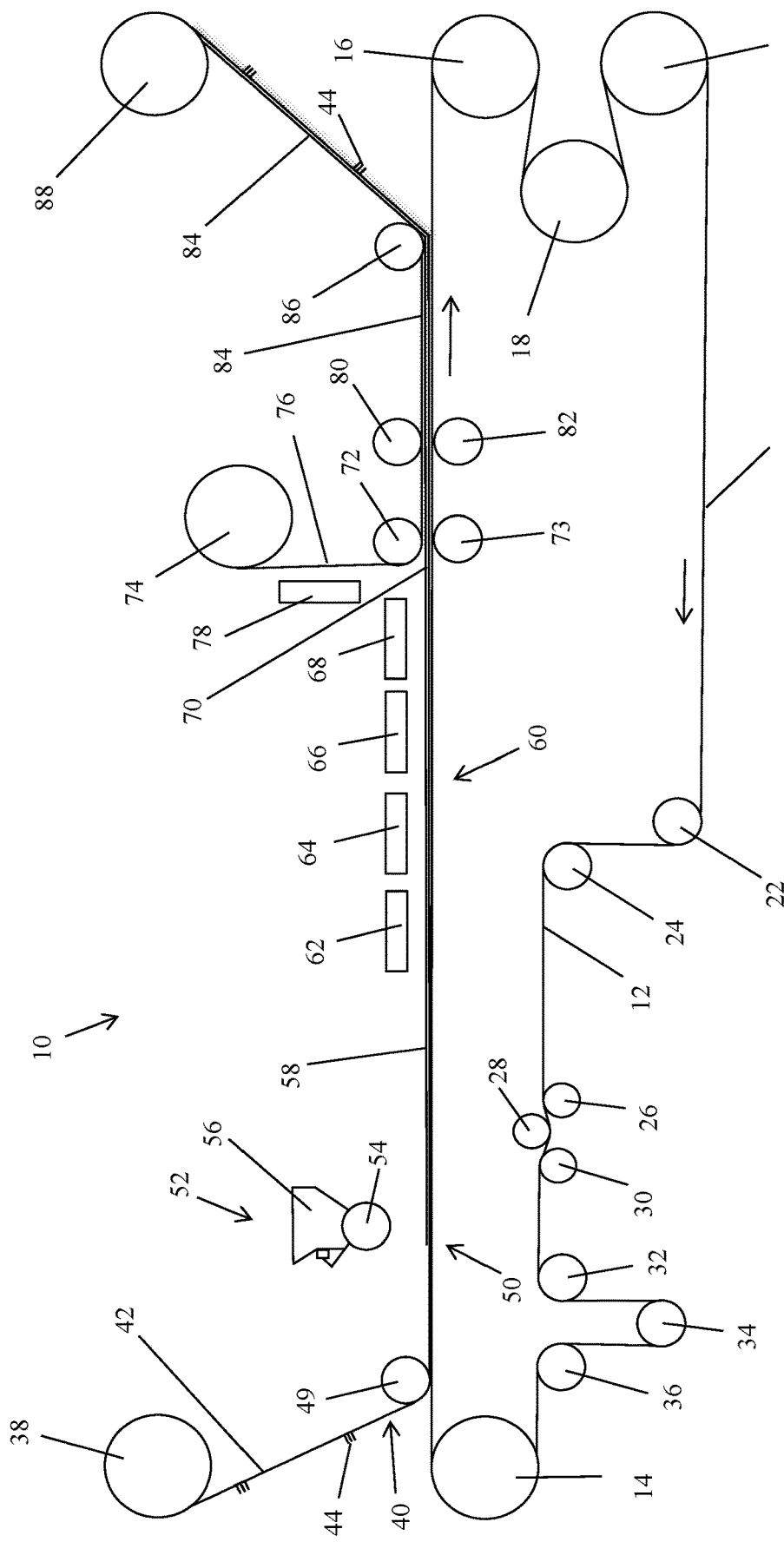
FIG. 1 is a schematic view of a disclosed embodiment of an apparatus for preparing synthetic turf using the adhesive system of the present invention.

Referring now to the drawing in which like numbers indicate like elements throughout the several views, there is shown in FIG. 1 a disclosed embodiment of an apparatus 10 for forming a polymer coating on the primary backing of a synthetic turf and attaching a polymer film to the primary backing in accordance with the present invention. The apparatus 10 comprises an endless conveyor belt 12 extending along an endless conveyor path over four drive rollers 14, 16, 18 and 20, which are driven by an electric motor (not shown), idler rollers 22, 24, belt guide rollers 26, 28, 30 and belt tensioner rollers 32, 34 and 36. The speed of the belt 12 is variably controllable to adjust to varying manufacturing needs.

From the drive roller 14, the conveyor belt 12, which preferably is constructed from Teflon coated fiberglass, is seen to pass around the drive rollers 16, 18, 20. The belt 12 is delivered to the idler rollers 22, 24, to the belt guide rollers 26, 28, 30, to the belt tensioner rollers 32, 34, 36 and then back to the drive roller 14.

Figure 2:
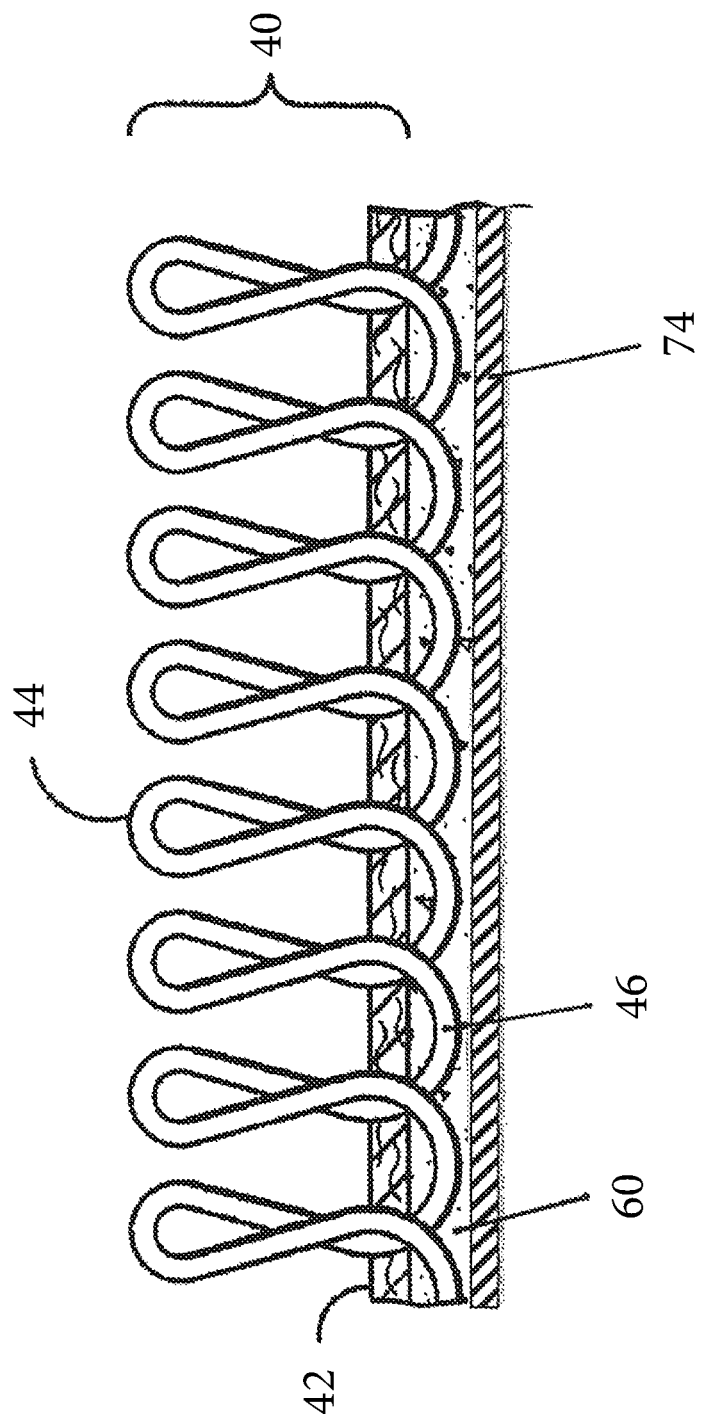
FIG. 2 is a cross-sectional side view of a tufted synthetic turf in accordance with the present invention.
Figure 3:
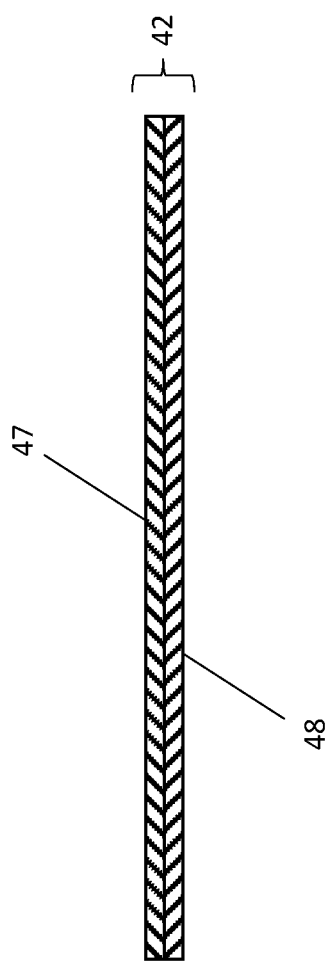
FIG. 3 is a cross-sectional view of a disclosed embodiment of a composite material for use as a primary backing material in the synthetic turf shown in FIG. 2.

Positioned above the belt 12 adjacent the drive roller 14 is a supply roll 38 of tufted greige goods 40 (FIG. 2). The tufted greige goods 40 comprise a synthetic primary backing material 42 and tufted synthetic yarns or filaments that form a face pile 44 on one side of the primary backing material and loop backs 46 on the other side of the primary backing material. The face pile 44 of synthetic turf is typically a cut pile, individual filaments or filament bundles. The primary backing material 42 can be woven or nonwoven. Both the face pile 44 and the primary backing material 42 can be made from natural or synthetic materials. Furthermore, the face pile 44 and primary backing material 42 can be made from the same material or different materials. Suitable thermoplastic materials for the face pile 44 and primary backing material 42 is preferably polypropylene. It is particularly preferred that the primary backing material 42 is made from a woven, flat strand polypropylene. More preferably, the primary backing material 42 is a composite material (FIG. 3) which comprises two separate layers attached to each other. The composite primary backing material 42 comprises a first layer 47 of woven of polypropylene and a second layer 48 of nonwoven polyethylene terephthalate. The second layer 48 of nonwoven polyethylene terephthalate is attached to the first layer 47 of woven polypropylene by a needling process that is well known in the art. The composite primary backing material 42 is tufted such that the face pile 44 is formed on the first layer 47 side of the composite and the loop backs 46 are formed on the second layer 48 side of the composite.

The tufted greige goods 40 is fed from the supply roll 38, around a roller 49 and onto the belt 12 where it lays flat on the surface of the belt and moves in unison with the belt. As can be seen in FIG. 1, the tufted greige goods 40 is positioned so that the face pile 44 extends downwardly from the primary backing material 42 so that the face pile is adjacent to and contacts the belt 12 and the primary backing material faces upwardly, or in the case of the composite primary backing material (FIG. 3), the second layer 48 faces upwardly. The tufted greige goods 40 on the belt 12 moves from the roller 49 to a polymer deposition station 50. The polymer deposition station 50 comprises a solid particle scatter coater 52 disposed above the tufted greige goods 40 on the belt 12. The particle scatter coater 52 comprises a knurled roller 54 that extends across the width of the primary backing material 42. The knurled roller 54 is rotatably driven by a variable speed motor (not shown). The knurled roller 54 is positioned below a hopper 56 that interfaces with the knurled roller so that solid particles disposed in the hopper are picked up by the knurls of the knurled roller as it rotates. As the knurled roller 54 rotates, the solid particles fall from the knurled roller onto the surface of the primary backing material 42 and form a randomly dispersed coating of solid particles thereon. Scatter coaters are known in the art and are commercially available from Practix Manufacturing LLC, Acworth, Ga. and Sandvik TPS Division of Sandvik Materials Technology Deutschland GmbH, Goppingen, Germany.

The solid polymer particles that are used to scatter coat the primary backing material 42 preferably comprise solid polymer particles, more preferably solid ethylene-vinyl acetate (EVA) particles. The ethylene-vinyl acetate is in solid particulate form having an average particle size (volume-based) of approximately 1 to approximately 1,000 microns. Stated another way, the size of the solid ethylene-vinyl acetate particles is such that they will pass through an 18-mesh screen. The solid ethylene-vinyl acetate polymer particles can be ground from ethylene-vinyl acetate polymer pellets to the desired particle sizes using methods known in the art including, but not limited to, a pulverizer or a hammer mill. Additionally, the ethylene-vinyl acetate from which the solid particles are made preferably has a melt index of approximately 5 to approximately 500 g/10 minutes at 190° C. and at a weight of 2.16 kg., more preferably approximately 5 to approximately 50 g/10 minutes at 190° C., especially approximately 23 g/10 minutes at 190° C. and at a weight of 2.16 kg. Melt Index as used herein is the measurement procedure set forth in ASTM D1238-13. Furthermore, the ethylene-vinyl acetate from which the solid particles are made preferably has a melting point of approximately 150 to approximately 250° F., more preferably approximately 180 to approximately 200° F., especially approximately 181° F.

The ethylene-vinyl acetate polymer particles can be applied to the primary backing material 42 as disclosed herein or as disclosed in co-pending U.S. patent application Ser. No. 15/608,334 filed May 30, 2017 (the disclosure of which is incorporated herein by reference in its entirety). Alternatively, the ethylene-vinyl acetate polymer particles can be applied to the primary backing material 42 as an emulsion or a latex as disclosed in co-pending U.S. patent application Ser. No. 15/469,637 filed Mar. 27, 2017 and Ser. No. 15/989,891 filed May 5, 2018 (the disclosures of which are incorporated herein by reference in their entirety).

The solid ethylene-vinyl acetate particles dispensed from the scatter coater 52 form a random coating of solid particles 58 on the primary backing material 42 preferably at a rate of approximately 5 to approximately 20 ounces of ethylene-vinyl acetate particles per square yard of primary backing material; more preferably approximately 8 to approximately 16 ounces of ethylene-vinyl acetate particles per square yard of primary backing material; especially approximately 8 ounces of ethylene-vinyl acetate particles per square yard of primary backing material.

Optionally, the ethylene-vinyl acetate polymer from which the solid particles are formed can include additives including, but not limited to, pigments, plasticizing aids, a lubricant, a blowing agent, a fire retardant, an inert filler and/or rheological modifiers.

The tufted primary backing material 42 bearing the coating or layer 58 of solid ethylene-vinyl acetate particles on the belt 12 moves from the polymer deposition station 50 to a polymer particle melting station 60. The polymer particle melting station 60 comprises a plurality of infrared heaters 62, 64, 66, 68 disposed above the tufted primary backing material 42 bearing the layer 58 of solid ethylene-vinyl acetate polymer particles on the primary backing material. The infrared heaters 62-68 are positioned a distance above the belt 12, the belt is at a speed and the infrared heaters are of a size such that the residence time of the tufted primary backing material 42 bearing the layer 58 of solid ethylene-vinyl acetate polymer particles under the infrared heaters is such that the solid ethylene-vinyl acetate polymer particles are heated to a temperature sufficient to melt the solid ethylene-vinyl acetate polymer particles so that they are fluid. The objective of using the infrared heaters 62-68 is to convert the solid ethylene-vinyl acetate polymer particles to a flowable material or a liquid layer 70 on the primary backing material 42. As the tufted primary backing material 42 bearing the melted ethylene-vinyl acetate polymer particles moves from the polymer particle melting station 60 it moves toward a press roller assembly comprising a first press roller 72 disposed above the belt 12 and a second opposed chilled press roller 73 disposed below the belt. Advantageously, the second layer 48 of nonwoven polyethylene terephthalate at least partially shields the first layer 47 of woven polypropylene from the heat applied by the infrared heaters 62-68 so as to prevent damage to the first layer of woven polypropylene.

Disposed above the belt 12 is a supply roll 74 of a polymer film 76. The polymer film is preferably made from linear low-density polyethylene (LLDPE). The polymer film preferably has a thickness of about 10 mils to about 80 mils, more preferably a thickness of about 40 mils. The polymer film 76 feeds from the supply roll 74 under a press roller 72. As the polymer film 76 travels from the supply roll 74 to the press roll 72, it passes by an infrared heater 78 directed toward the polymer film. The infrared heater 78 preheats the polymer film 76 to a temperature above room temperature and sufficiently high such that the polymer film adheres to the layer 70 of molten ethylene-vinyl acetate polymer on the primary backing material 42. The infrared heater 78 preheats the polymer film 76 to a temperature above 100° F. to below the softening point of the polymer film, preferably about 110 to about 200° F., more particularly about 125 to about 175° F. It is an essential step to preheat the polymer film 76, as set forth above, because the polymer film will not satisfactorily adhere to the primary backing material without the preheating step.

As the tufted primary backing material 42 bearing the layer 70 of molten ethylene-vinyl acetate polymer moves from the polymer particle melting station 60 and passes under the press roller 72, the polymer film 76 is pressed into intimate contact with the melted ethylene-vinyl acetate polymer on the tufted primary backing material 42. The pressure of the press roller 72 on the primary backing material 42 and the polymer film 76 causes the melted ethylene-vinyl acetate polymer to flow into the primary backing material and bonds primary backing material to the polymer film. Optionally, but preferably, the tufted primary backing material 42, the adhered polymer film 75 and the belt 12 pass between a first chilled press roller 80 disposed above the belt and a second opposed chilled press roller 82 disposed below the belt. The chilled press rollers 80, 82 are hollow rollers into which coolant is circulated. As the primary backing material 42, the molten layer 70 of polyethylene polymer and the polymer film 76 pass under the chilled press rollers 80, 82 the molten layer of ethylene-vinyl acetate polymer is pressed into intimate contact with the primary backing material and the polymer film. Then, the chilled press rollers 80, 82 cools the primary backing material 42 and the polymer film 76, which in turn removes heat from the melted ethylene-vinyl acetate polymer and causes it to solidify thereby securely attaching the polymer film to the primary backing material and also further securely anchoring the loop backs 46 in the primary backing material, which forms a laminated synthetic turf structure 84.

The laminated synthetic turf structure 84 moves with the belt 12 from the press rollers 72, 73, or optionally from the chilled press rollers 80, 82, to a stripping roller 86 where the laminated turf structure is removed from the belt and collected in a take up roll 88.

The following example is illustrative of selected embodiments of the present invention and are not intended to limit the scope of the invention.

Example 1

A tufted synthetic turf is prepared in accordance with the present invention using the apparatus disclosed in FIG. 1. The primary backing is tufted with 5 strands per tuft bundle. The greige goods comprise a 1-inch pile height of polyethylene strands tufted into a woven polypropylene (PP) primary backing with attached nonwoven polyethylene terephthalate (PET) scrim. Ethylene-vinyl acetate (EVA) polymer pellets are ground to form fine particles having a volume-based average particle size of approximately 590 microns. The ethylene-vinyl acetate has a melting point of 181° F. and a melt index of 23 g/10 min. at 190° C. and a weight of 2.16 kg. as measured in accordance with ASTM D1238-13.

The ethylene-vinyl acetate particles are applied to the primary backing material 42 of the greige goods 40 from the scatter coater 52 to form a layer thereon at the rate of 8 ounces per square yard. The particle-coated primary backing 58 is passed under the bank of infrared heaters 62-68 to heat the polymer particles. The ethylene-vinyl acetate particles are heated to a temperature above their melting point so that they are rendered flowable. A 40-mil linear low-density polyethylene film is preheated to a temperature of about 150° F. The preheated polymer film and the primary backing bearing the coating of melted ethylene-vinyl acetate are passed under the press roller 72 so that the molten ethylene-vinyl acetate both adheres the polymer film to the primary backing and locks the tufts securely in the primary backing.

The synthetic turf in accordance with the present invention is easier to install in a land reclamation site because it is not necessary to separately install a geomembrane and secure a conventional synthetic turf thereon. The synthetic turf in accordance with the present invention can be installed in a land reclamation site in a single step because it is a unitary product thereby requiring less labor to install.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of making synthetic turf comprising:
    applying an ethylene vinyl acetate copolymer adhesive to a first primary surface of a tufted primary backing to form a coating thereon and wherein the primary backing is tufted with a plurality of synthetic filaments to form a face pile extending outwardly from a second primary surface of the synthetic turf opposite the first primary surface; and
    heating the ethylene vinyl acetate copolymer adhesive to a temperature above its melting point so that the ethylene-vinyl acetate copolymer adhesive melts and at least partially flows into the primary backing;
    heating a linear low-density polyethylene film to a temperature below the softening point of the film;
    pressing the heated linear low-density polyethylene film into contact with the polymer coated first primary surface of the tufted primary backing; and
    allowing the ethylene vinyl acetate copolymer adhesive and the linear low-density polyethylene film to cool, whereby the linear low-density polyethylene film is adhered to the tufted primary backing.

2. The method of claim 1, wherein the linear low-density polyethylene film is heated to a temperature of about 125 to about 175° F.

3. The method of claim 1, wherein the primary backing comprises a woven polypropylene.

4. The method of claim 1, wherein the primary backing comprises a woven polypropylene fabric and a polyethylene terephthalate nonwoven fabric attached to one side of the woven polypropylene fabric.

5. The method of claim 4, wherein the polyethylene terephthalate nonwoven fabric is attached to the woven polypropylene fabric by needling.

6. The method of claim 1, wherein the linear low-density polyethylene film has a thickness of about 40 mils.

7. The method of claim 1, wherein the ethylene vinyl acetate copolymer adhesive is applied at a rate of approximately 5 to approximately 20 ounces per square yard of primary backing.

8. The method of claim 1, wherein the ethylene vinyl acetate copolymer adhesive is applied at a rate of approximately 8 to approximately 16 ounces per square yard of primary backing.

9. The method of claim 1, wherein the ethylene vinyl acetate copolymer adhesive is applied at a rate of approximately 8 ounces per square yard of primary backing.

10. The method of claim 1, wherein the ethylene vinyl acetate copolymer adhesive is applied in the form of solid ethylene-vinyl acetate polymer particles having an average particle size of approximately 1 to approximately 1,000 microns.

11. The method of claim 10, wherein the solid ethylene-vinyl acetate polymer particles have a melt index of approximately 5 to approximately 500 grams/10 minutes at 190° C. at a weight of 2.16 kg.

12. The method of claim 1, wherein the ethylene vinyl acetate copolymer adhesive comprises approximately 18% by weight vinyl acetate.

13. A method of making synthetic turf comprising:
    applying an ethylene-vinyl acetate copolymer adhesive to a first primary surface of a tufted primary backing to form a coating thereon and wherein the primary backing is tufted with a plurality of synthetic filaments to form a face pile extending outwardly from a second primary surface of the synthetic turf opposite the first primary surface, wherein the primary backing comprises a woven polypropylene; and
    heating the ethylene-vinyl acetate copolymer adhesive to a temperature above its melting point so that the ethylene-vinyl acetate copolymer adhesive melts and at least partially flows into the primary backing;
    heating a linear low-density polyethylene film to a temperature of about 125 to about 175° F.;
    pressing the heated linear low-density polyethylene film into contact with the polymer coated first primary surface of the tufted primary backing; and
    allowing the ethylene-vinyl acetate copolymer adhesive and the linear low-density polyethylene film to cool, whereby the linear low-density polyethylene film is adhered to the tufted primary backing.

14. The method of claim 13, wherein the primary backing comprises a woven polypropylene fabric and a polyethylene terephthalate nonwoven fabric attached to one side of the woven polypropylene fabric.

15. The method of claim 14, wherein the polyethylene terephthalate nonwoven fabric is attached to the woven polypropylene fabric by needling.

16. The method of claim 15, wherein the linear low-density polyethylene film has a thickness of about 40 mils.

17. The method of claim 16, wherein the ethylene vinyl acetate copolymer adhesive is applied at approximately 5 to approximately 20 ounces per square yard of primary backing.

18. The method of claim 16, wherein the ethylene vinyl acetate copolymer adhesive is applied at a rate of approximately 8 to approximately 16 ounces per square yard of primary backing.

19. The method of claim 16, wherein the ethylene vinyl acetate copolymer adhesive is applied at a rate of approximately 8 ounces per square yard of primary backing.

20. The method of claim 17, wherein the ethylene vinyl acetate copolymer adhesive is applied in the form of solid ethylene-vinyl acetate polymer particles have an average particle size of approximately 1 to approximately 1,000 microns.

21. The method of claim 20, wherein the solid ethylene-vinyl acetate polymer particles have a melt index of approximately 5 to approximately 500 grams/10 minutes at 190° C. at a weight of 2.16 kg.

22. The method of claim 21, wherein the ethylene vinyl acetate copolymer adhesive comprises approximately 18% by weight vinyl acetate.

* * * * *